(12) United States Patent
Fernald

(10) Patent No.: US 9,169,158 B2
(45) Date of Patent: Oct. 27, 2015

(54) NON-CHEMICAL AIR ENTRAINED ADMIX

(75) Inventor: Mark R. Fernald, Enfield, CT (US)

(73) Assignee: CIDRA CORPORATE SERVICES INC., Wallingford, CT (US)

( * ) Notice: Subject to any disclaimer, the term of this patent is extended or adjusted under 35 U.S.C. 154(b) by 189 days.

(21) Appl. No.: 13/637,065

(22) PCT Filed: Apr. 15, 2011

(86) PCT No.: PCT/US2011/032697
§ 371 (c)(1),
(2), (4) Date: Dec. 3, 2012

(87) PCT Pub. No.: WO2011/130637
PCT Pub. Date: Oct. 20, 2011

(65) Prior Publication Data
US 2013/0133553 A1 May 30, 2013

Related U.S. Application Data

(60) Provisional application No. 61/342,586, filed on Apr. 16, 2010.

(51) Int. Cl.
*C04B 16/08* (2006.01)
*C04B 20/00* (2006.01)
*C04B 38/00* (2006.01)
*C08K 7/22* (2006.01)
*C04B 7/02* (2006.01)
(Continued)

(52) U.S. Cl.
CPC .............. *C04B 7/02* (2013.01); *C04B 20/0008* (2013.01); *C04B 20/0036* (2013.01); *C04B 28/04* (2013.01); *C04B 40/0039* (2013.01)

(58) Field of Classification Search
CPC .............. C04B 20/002; C04B 20/0056; C04B 20/0032
See application file for complete search history.

(56) References Cited

U.S. PATENT DOCUMENTS 3,902,911 A * 9/1975 Messenger .................... 106/676
4,002,482 A   1/1977 Coenen
4,370,166 A   1/1983 Powers et al.
(Continued)

FOREIGN PATENT DOCUMENTS

WO       2011112673       9/2011

OTHER PUBLICATIONS

"Aggregate". Cement and Concrete Basic. May 11, 2008 [Retrieved on Jun. 1, 2014]. Retrieved from http://web.archive.org/web/20080511171235/http://www.cement.org/basics/concretebasics_aggregate.asp.*

*Primary Examiner* — Kaj K Olsen
*Assistant Examiner* — Karam Hijji

(57) ABSTRACT

An improved concrete is provided having a concrete formed from a wet concrete mixture; and a non-chemical admix added to the wet concrete mixture and configured to contain bubbles in order to control the amount of entrained air formed in the concrete when the wet concrete mixture cures into the improved concrete. The non-chemical admix includes a multiplicity of hollow objects, bodies, elements or structures, each configured with a respective cavity, unfilled space, or hole to trap and maintain a bubble inside. The hollow objects, bodies, elements or structures include hollow cylinders, or spheres, or capillary tubes, or some combination thereof. Each hollow object, body, element or structure is configured with a dimension so as not to absorb liquid, including water, including where the dimension is in a range of about 20-30 microns, and is made of glass or a glass-like material.

23 Claims, 5 Drawing Sheets

The Hollow Glass Cylinder

(51) Int. Cl.
*C04B 28/04* (2006.01)
*C04B 40/00* (2006.01)

(56) References Cited

U.S. PATENT DOCUMENTS

| | | |
|---|---|---|
| 5,989,334 A | 11/1999 | Dry |
| 6,609,069 B2 | 8/2003 | Gysling |
| 6,824,607 B2 | 11/2004 | Baeuml et al. |
| 6,889,562 B2 | 5/2005 | Gysling et al. |
| 7,330,797 B2 | 2/2008 | Bailey et al. |
| 7,400,985 B2 | 7/2008 | Fernald et al. |
| 7,474,966 B2 | 1/2009 | Fernald et al. |
| 7,658,794 B2 | 2/2010 | Gleeson et al. |
| 7,673,524 B2 | 3/2010 | Bailey et al. |
| 7,895,903 B2 | 3/2011 | Bailey et al. |
| 8,038,790 B1 * | 10/2011 | Dubey et al. ............... 106/675 |
| 2001/0050032 A1 * | 12/2001 | Dry ............................. 106/677 |
| 2004/0112255 A1 | 6/2004 | Bruno et al. |
| 2005/0098317 A1 * | 5/2005 | Reddy et al. ............... 166/294 |
| 2007/0079733 A1 * | 4/2007 | Crocker ....................... 106/711 |
| 2009/0011207 A1 * | 1/2009 | Dubey ......................... 428/219 |
| 2013/0133553 A1 | 5/2013 | Fernald |

* cited by examiner

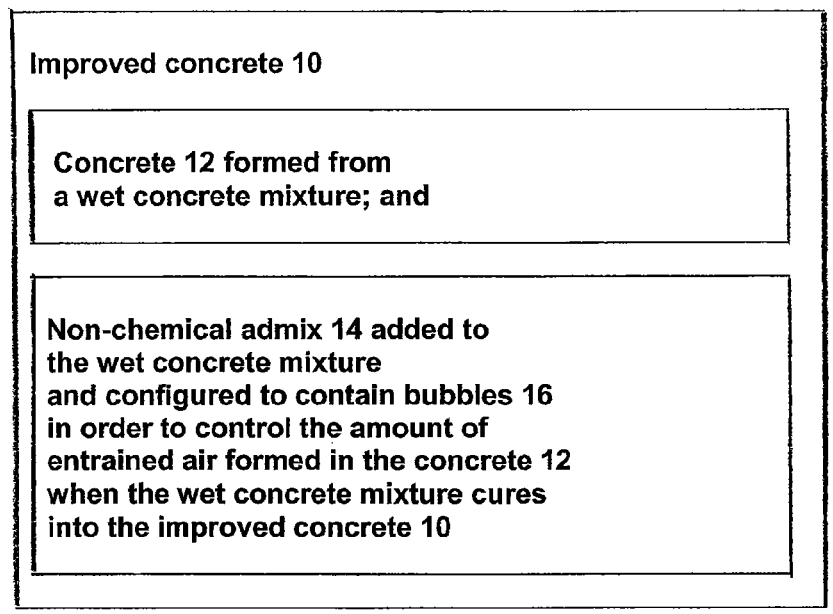
Figure 1a: The Improved Concrete
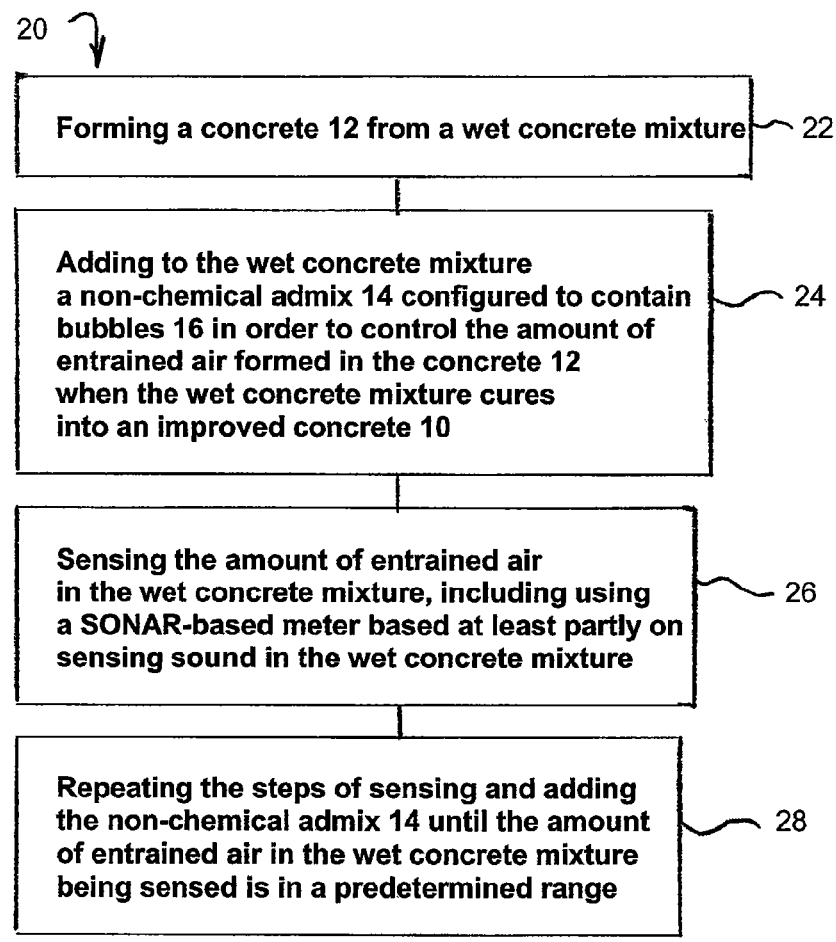
Figure 1b: The Method

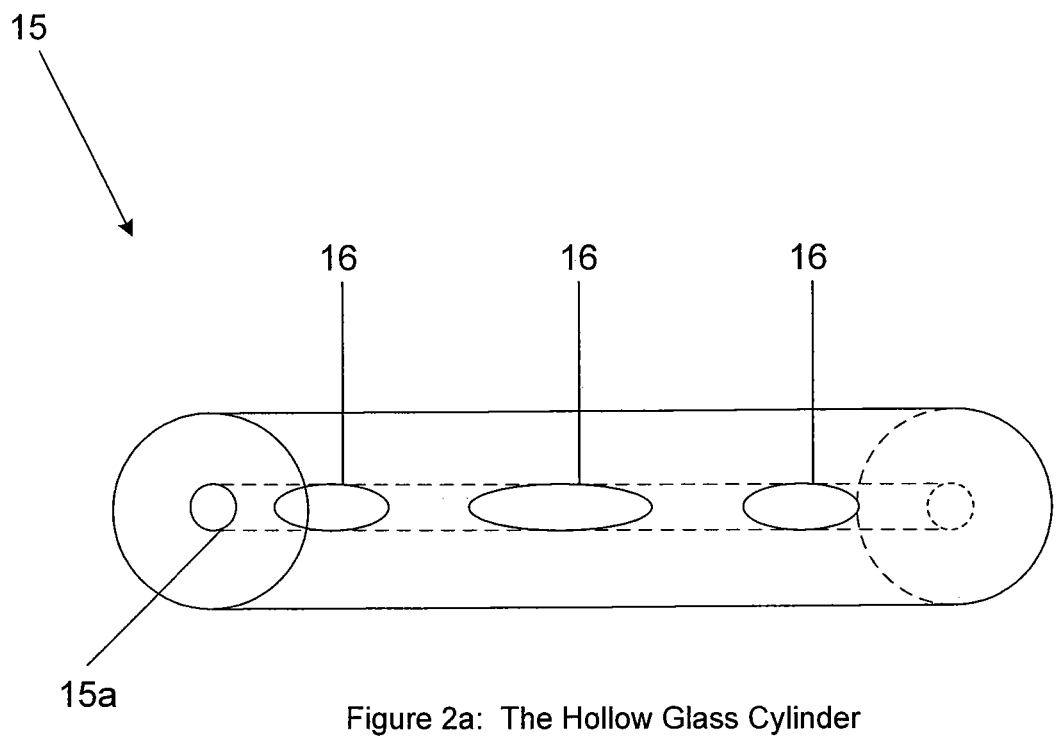
Figure 2a: The Hollow Glass Cylinder
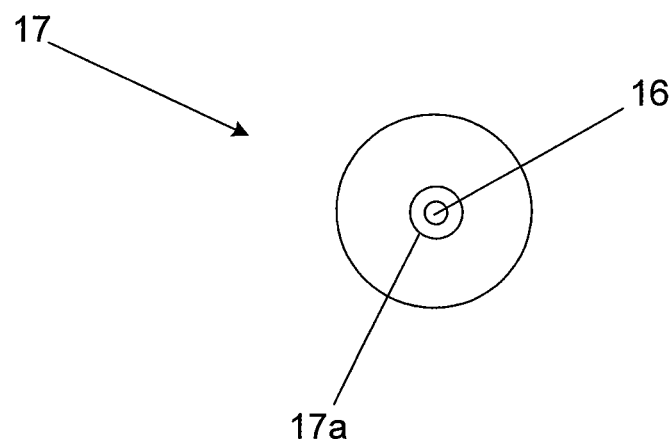
Figure 2b: The Hollow Sphere

NON-CHEMICAL AIR ENTRAINED ADMIX

CROSS-REFERENCE TO RELATED PATENT APPLICATIONS

The present application corresponds to international patent application serial no. PCT/US2011/032697, filed 15 Apr. 2011, which claims the benefit of U.S. Provisional Patent Application No. 61/342,586, filed 16 Apr. 2010, which is incorporated by reference herein in its entirety.

BACKGROUND OF THE INVENTION

1. Technical Field

This invention relates generally to concrete; and more particularly to a method and apparatus for making an improved concrete using a non-chemical admix.

2. Description of Related Art

Concrete is known in the art as a hard strong building material made by mixing a cementing material and a mineral aggregate with sufficient water to cause the cement to set and bind the entire mass. Concrete has been in use since Roman times, and is made up of four main ingredients: coarse aggregate (gravel, usually between 0.5 to 1.5 inch in diameter), fine aggregate (sand, usually between 0.005 and 0.25 inch in diameter), cement (e.g., Portland cement), and water. Air also plays an important part, and often special additives (called admixtures or admixes) are also added to improve or modify the concrete's properties. Concrete is one of the most versatile construction materials available in the world.

Cement for making concrete is known in the art, and cement used in construction is characterized as hydraulic or non-hydraulic. Hydraulic cements (e.g., Portland cement) harden because of hydration, chemical reactions that occur independently of the mixture's water content; they can harden even underwater or when constantly exposed to wet weather. The chemical reaction that results when the anhydrous cement powder is mixed with water produces hydrates that are not water-soluble. In comparison, non-hydraulic cements (e.g., lime and gypsum plaster) must be kept dry in order to retain their strength. Portland cement is produced by pulverizing clinkers consisting essentially of hydraulic calcium silicates, usually containing one or more of the forms of calcium sulfate as an inter ground addition. Clinkers are nodules (diameters, 0.2-1.0 inch [5-25 mm]) of a sintered material that is produced when a raw mixture of predetermined composition is heated to high temperature. The low cost and widespread availability of the limestone, shales, and other naturally occurring materials make Portland cement one of the lowest-cost materials widely used over the last century throughout the world.

Admixtures for making concrete are known in the art and include materials in the form of powder or fluids that are added to the concrete to give it certain characteristics not obtainable with plain concrete mixes. Admixtures made from powder or fluid are known in the art as "chemical" admixtures. In normal use, admixture dosages are less than 5% by mass of cement, and are added to the concrete at the time of batching/mixing. The common types of chemical admixtures are as follows: accelerators, retarders, air entrainments, plastercizers, pigment, corrosion inhibitors, bonding agents and pumping aids. The accelerators speed up the hydration (hardening) of the concrete. Typical materials used are $CaCl_2$, $Ca(NO_3)_2$, and NaNO3. However, use of chlorides may cause corrosion in steel reinforcing and is prohibited in some countries and therefore nitrates may be favoured. The retarders slow the hydration of concrete, and are used in large or difficult pours where partial setting before the pour is complete is undesirable. Typical polyol retarders are sugar, sucrose, sodium gluconate, glucose, citric acid, and tartaric acid. The air entrainments add and entrain tiny air bubbles in the concrete, which will reduce damage during freeze thaw cycles thereby increasing the concrete's durability. However, entrained air is a trade-off with strength, as each 1% of air may result in up to a 5% decrease in compressive strength. The plastercizers increase the workability of plastic or "fresh" concrete, allowing it be placed more easily, with less consolidating effort. Typical plasticizers are lignosulfonate. Plasticizers can be used to reduce the water content of a concrete while maintaining workability, and are sometimes called water-reducers due to this use. Such treatment improves its strength and durability characteristics. Superplasticizers (also called high-range water-reducers) are a class of plasticizers that have fewer deleterious effects, and can be used to increase workability more than practical with traditional plasticizers. Compounds used as superplasticizers include sulfonated naphthalene formaldehyde condensate, sulfonated melamine formaldehyde condensate, acetone formaldehyde condensate, and polycarboxylate ethers. The pigment can be used to change the color of concrete, for aesthetics. The corrosion inhibitors are used to minimize the corrosion of steel and steel bars in concrete. The bonding agents are used to create a bond between old and new concrete. The pumping aids improve pumpability, thicken the paste, and reduce separation and bleeding.

Consistent with that stated above, the durability of concrete is a strong function of the entrained air levels within the mix. Inadequate levels reduce the freeze thaw durability and too high of level reduces its strength. It is estimated that entrained air can typically reduce the strength of concrete by about 2-4% per 1% entrained air. The nominal levels of entrained air are in the 4% to 6% range. In order to achieve this, concrete manufacturers typically add admixes to control the air level. Generally, there is significant variation in the entrained air levels from mix to mix and tight control is difficult to maintain. It is also known in the art to add fishing line into the wet concrete mixture in order to improve the durability of concrete.

There is a need in the industry to control the air levels as well as improve the strength of aerated concrete.

SUMMARY OF THE INVENTION

The present invention provides novel techniques to control the air levels as well as improve the strength of aerated concrete.

According to some embodiments, the present invention may take the form of a new and improved concrete comprising a concrete formed from a wet concrete mixture, where a non-chemical admix is added to the wet concrete mixture and configured to contain bubbles in order to control the amount of entrained air formed in the concrete when the wet concrete mixture cures into the improved concrete.

According to some embodiments of the present invention, the non-chemical admix may include a multiplicity of hollow objects, bodies, elements or structures, each configured with a respective cavity, unfilled space, or hole to trap and maintain a bubble inside.

According to some embodiments of the present invention, the hollow objects, bodies, elements or structures may include hollow cylinders, or spheres, or capillary tubes, or some combination thereof. Each hollow object, body, element or structure may be configured with a dimension so as not to absorb liquid, including water, including where the dimension is in a range of about 20-30 microns. Each hollow object, body, element or structure may be made of glass or a glass-like material. By way of example, the multiplicity of hollow objects, bodies, elements or structures may comprise a number in a range of about 1 billion parts per cubic foot of concrete. The multiplicity of hollow objects, bodies, elements or structures may be configured with chemicals applied to prevent migration of liquid into respective cavities, unfilled spaces, or holes before the wet concrete mixture cures, including where the chemicals are hydrophobic chemicals, or where the hydrophobic chemicals have a half life longer than the cure time of the concrete, or where the chemicals are sealants.

According to some embodiments of the present invention, the bubbles may take the form of a small quantity of gas, including air, that is trapped or maintained in the cavities, unfilled spaces, or holes of the multiplicity of hollow objects, bodies, elements or structures. The amount of entrained air formed in the concrete may be in a predetermined range of about 4% to 6%. The wet concrete mixture may include some combination of a coarse aggregate, a fine aggregate, Portland cement, and water, including where the coarse aggregate comprises gravel, e.g., between 0.5 to 1.5 inch in diameter, and/or where the fine aggregate includes sand, e.g., between 0.005 and 0.25 inch in diameter. By way of example, the non-chemical admix may be made from a material or substance that is substantially the same as the material or substance used for the fine aggregate, e.g. silicon dioxide.

According to some embodiments, the present invention may take the form of a method for making an improved concrete comprising forming a concrete from a wet concrete mixture; and adding to the wet concrete mixture a non-chemical admix configured to contain the bubbles in order to control the amount of entrained air formed in the concrete when the wet concrete mixture cures into the improved concrete.

According to some embodiments of the present invention, the method may be implemented using one or more of the features set forth above.

According to some embodiments of the present invention, the sensing may include using a SONAR-based meter based at least partly on sensing unsteady pressures in the wet concrete mixture in order to determine the amount of entrained air in the wet concrete mixture.

According to some embodiments, the present invention may take the form of an improved concrete prepared in accordance with a method comprising the steps set forth herein, including: forming a concrete from a wet concrete mixture; and adding to the wet concrete mixture a non-chemical admix configured to contain bubbles in order to control the amount of entrained air formed in the concrete when the wet concrete mixture cures into the improved concrete.

In operation, the air level may be controlled through this new type of non-chemical admix. In one embodiment according to the present invention, this "admix" may be comprised of, e.g., small hollow glass cylinders. The small hollow glass cylinders would act as "bubbles" when mixed with the fresh concrete. One advantage is that the amount can be accurately controlled to yield any desired entrained air value. A second advantage is that the material, $SiO_2$, is very compatible with constituents currently used in concrete and should offer improved strength of the mix over standard entrained air bubbles because the air bubble is formed by glass.

The small hollow glass cylinders can be manufactured using standard drawing and dicing processes. In addition, chemicals can be applied to the cylinders to prevent migration of water into the cylinder before the mix is cured. In addition, antifoam chemicals can be added to the mix to prevent the development of standard air bubbles.

BRIEF DESCRIPTION OF THE DRAWING

Referring now to the drawing, which are not drawn to scale, the foregoing and other features and advantages of the present invention will be more fully understood from the following detailed description of illustrative embodiments, taken in conjunction with the accompanying drawing in which like elements are numbered alike:

FIG. 1a is a diagram of an improved concrete according to some embodiments of the present invention.

FIG. 1b is a diagram of a flowchart of a method for making an improved concrete according to some embodiments of the present invention.

FIG. 2a is a diagram of a hollow glass cylinder that forms part of an admix used to make the improved concrete shown in FIG. 1a, according to some embodiments the present invention.

FIG. 2b is a diagram of a hollow sphere that forms part of an admix used to make the improved concrete shown in FIG. 1a, according to some embodiments the present invention.

DETAILED DESCRIPTION OF THE INVENTION

FIG. 1a

Figures 3, 4:
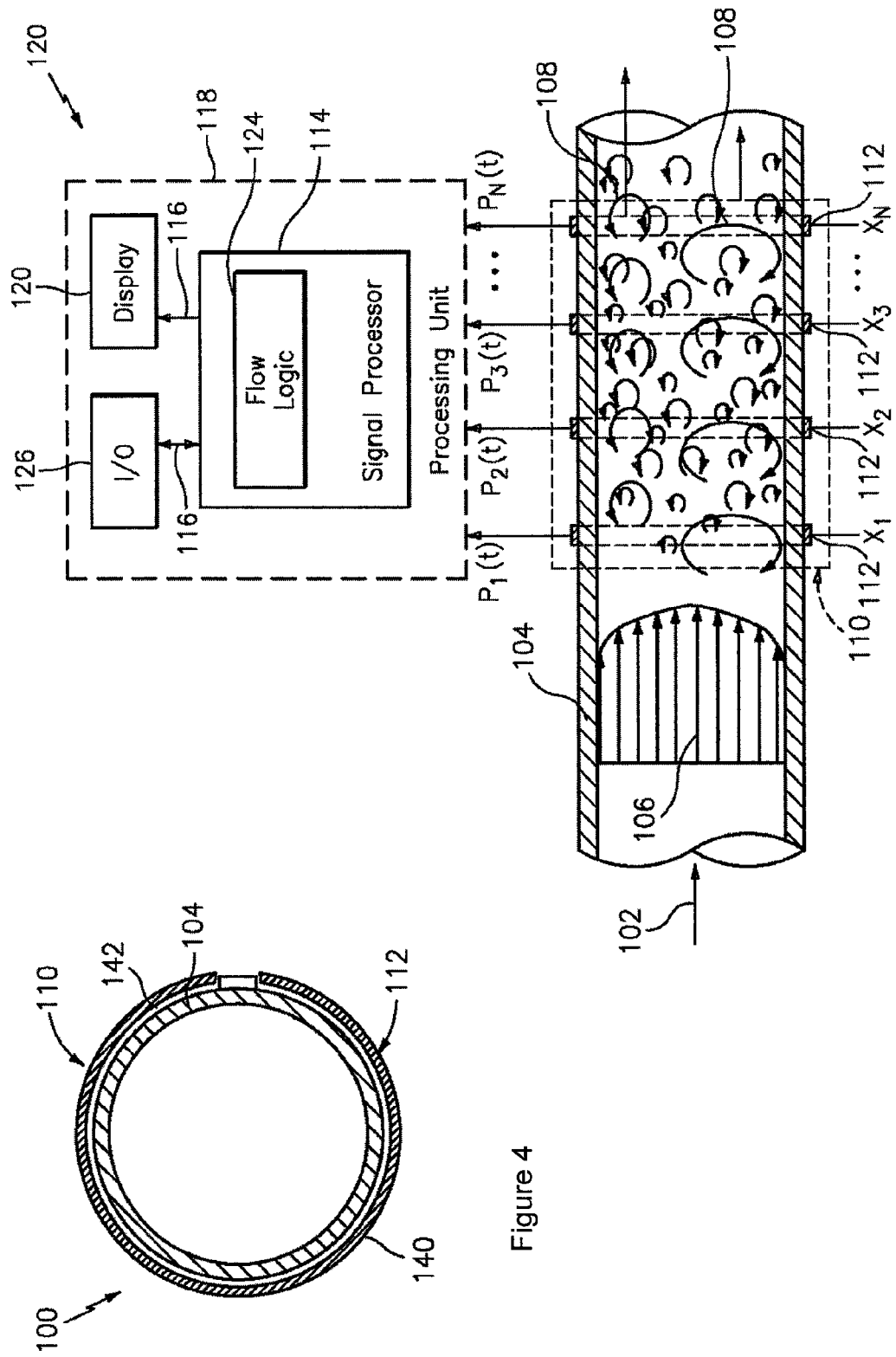
FIG. 3 is schematic diagram of an apparatus known in the art for determining at least one parameter associated with a fluid flowing in a pipe using a known spatial sensor array.
FIG. 4 is a cross-sectional view of a pipe having the known spatial sensor array of FIG. 3.

FIG. 1a shows a block diagram of an improved concrete generally indicated as 10 according to the present invention that includes a concrete 12 formed from a wet concrete mixture, where a non-chemical admix 14 is added to the wet concrete mixture and configured to contain bubbles 16 (see FIGS. 2a and 2b) in order to control the amount of entrained air formed in the concrete 12 when the wet concrete mixture cures into the improved concrete 10.

By way of example, the non-chemical admix 14 may include a multiplicity of hollow objects, bodies, elements or structures, each generally indicated as 15 (FIG. 2a) or 17 (FIG. 2b) configured with a respective cavity, unfilled space, or hole indicated as 15a (FIG. 2a) or 17a (FIG. 2b) to trap and maintain one or more bubbles 16 inside.

The multiplicity of hollow objects, bodies, elements or structures may include hollow cylinders like element 15 (FIG. 2a) or spheres like 17 (FIG. 2b), as well as capillary tubes, or some combination thereof. The scope of the invention is not intended to be limited to the type, kind or geometric shape of the hollow object, body, element or structure or the uniformity of the mixture of the same. Each hollow object, body, element or structure 15 (FIG. 2a) or 17 (FIG. 2b) may be configured with a dimension so as not to absorb liquid, including water, including where the dimension is in a range of about 20-30 microns. Each hollow object, body, element or structure 15 (FIG. 2a) or 17 (FIG. 2b) may be made of glass or a glass-like material, as well as some other suitable material either now known or later developed in the future.

By way of example, the multiplicity of hollow objects, bodies, elements or structures like 15 (FIG. 2a) or 17 (FIG.

2b) that form part of the admix 14 may include a number in a range of about 1 billion parts per cubic foot of concrete 12, although the scope of the invention is not intended to be limited per se to the specific parts per cubic foot of admix being used in the concrete.

The multiplicity of hollow objects, bodies, elements or structures like 15 (FIG. 2a) or like 17 (FIG. 2b) may be configured with chemicals applied to prevent migration of liquid into respective cavities, unfilled spaces or holes before the wet concrete mixture cures, including where the chemicals are hydrophobic chemicals, or where the hydrophobic chemicals have a half life longer than the cure time of the concrete, or where the chemicals are sealants. The one or more hollow cylinders like 15 may also include hollow glass cylinders manufactured using a drawing and dicing process.

The one or more bubbles 16 may take the form of a small quantity of gas, including air, that is trapped or maintained in the cavities, unfilled spaces, or holes 15a or 17a of the multiplicity of hollow objects, bodies, elements or structures. The amount of entrained air formed in the concrete may be in a predetermined range of about 4% to 6%, although the scope of the invention is intended to be limited to this specific range or any other specific range. The wet concrete mixture may include some combination of a coarse aggregate, a fine aggregate, Portland cement, and water, including where the coarse aggregate comprises gravel, e.g., between 0.5 to 1.5 inch in diameter, and/or where the fine aggregate includes sand, e.g., between 0.005 and 0.25 inch in diameter.

By way of example, the present invention is described in relation to the use of a glass material for the non-chemical admix which is consistent with the use of sand as the fine aggregate, since glass and sand are made of substantially the same material, i.e. silicon dioxide. However, the scope of the invention is intended to include other types or kind of materials for the non-chemical admix that are either now known or later developed in the future. For example, the choice of the other types or kind of material for the non-chemical admix may depend and be consistent with the choice of the material used for the fine aggregate.

FIG. 1 b

The Method

According to some embodiments, the present invention may take the form of a method generally indicated as 20 in FIG. 1 b for making the improved concrete 10.

As shown, and by way of example, the method 20 may include a step 22 for forming the concrete 12 from the wet concrete mixture; and a step 24 for adding to the wet concrete mixture the non-chemical admix 14 configured to contain the bubbles 16 in order to control the amount of entrained air formed in the concrete 12 when the wet concrete mixture cures into the improved concrete 10.

According to some embodiments of the present invention, the method may also include a step 26 for sensing the amount of entrained air in the wet concrete mixture, e.g., using a SONAR-based meter based at least partly on sensing unsteady pressures in the wet concrete mixture in order to determine the amount of entrained air in the wet concrete mixture, consistent with the SONAR-based and signal processing technique described herein in relation to FIGS. 3-6. The SONAR-based meter may be arranged in relation to a container, a vat, etc. having the wet concrete mixture therein. The method may also include a step 28 for repeating the steps 24 and 26 of sensing the amount of entrained air and adding the non-chemical admix 14 until the amount of entrained air in the wet concrete mixture being sensed is in a predetermined range, including e.g. 4% to 6%.

FIGS. 3-6

Example of Known SONAR-Based Sensing and Signal Processing Technology

By way of example, FIGS. 3-6 disclose known SONAR-based sensing and signal processing technology disclosed in U.S. Pat. No. 6,609,069 and U.S. Pat. No. 6,889,562, each of which are incorporated herein by reference in their entireties, related to unsteady pressures along a pipe caused by coherent structures (e.g., turbulent eddies and vortical disturbances) that convect with a fluid flowing in the pipe contain useful information regarding parameters of the fluid, where the unsteady pressures along the pipe are sensed using a spatial array 110 of at least two sensors 112 shown in FIG. 3. FIG. 3 shows apparatus for measuring the velocity and/or volumetric flow of a fluid flowing within a pipe that is also similar to that described, by way of example, in U.S. Pat. No. 7,400,985; U.S. Pat. No. 7,673,524; U.S. Pat. No. 7,895,903, as well as U.S. patent application Ser. No. 10/712,833, filed on Nov. 12, 2003, now abandoned, which are all hereby incorporated herein by reference.

In FIG. 3, the known apparatus 100 measures at least one parameter associated with a flow 102 flowing within a duct, conduit or other form of pipe 104, wherein the parameter of the flow 102 may include, for example, at least one of the velocity of the flow 102 and the volumetric flow rate of the flow 102. The flow 102 is shown passing through the pipe 104, wherein the flow 102 is depicted as a non-stratified, Newtonian flow operating in the turbulent regime at Reynolds numbers above about 100,000. The flow 102 has a velocity profile 106 that is uniformly developed from the top of the pipe 104 to the bottom of the pipe 104. Furthermore, the coherent structures 108 in the non-stratified, turbulent, Newtonian flow 102 exhibit very little dispersion. In other words, the speed of convection of the coherent structures 108 is not strongly dependent on the physical size of the structures 108. It should be appreciated that, as used herein, dispersion describes the dependence of convection velocity with wavelength, or equivalently, with temporal frequency. It should also be appreciated that flows for which all wavelengths convect at a constant velocity are termed "non-dispersive" and for turbulent, Newtonian flow, there is typically not a significant amount of dispersion over a wide range of wavelength to diameter ratios.

While the flow 102 is depicted as having a uniform velocity profile, it should be appreciated that the present invention may be used to measure stratified flows 102. Stratified flow 102 has a velocity profile 106 that is skewed from the top of the pipe 104 to the bottom of the pipe 104, as may be found in industrial fluid flow processes involving the transportation of a high mass fraction of high density, solid materials through a pipe 104 where the larger particles travel more slowly at the bottom of the pipe 104. For example, the flow 102 may be part of a hydrotransport process.

The apparatus 100 of FIG. 3 measures parameters such as velocity and volumetric flow rate of a stratified flow and/or non-stratified flow 102, wherein the apparatus 100 may include a spatial array 110 of at least two sensors 112 disposed at different axial locations $x_1 \ldots x_N$ along the pipe 104. Each of the sensors 112 provides a pressure signal P(t) indicative of unsteady pressure created by coherent structures convecting with the flow 102 within the pipe 104 at a corresponding axial location $x_1 \ldots x_N$ of the pipe 104. The pressure generated by the convective pressure disturbances (e.g., eddies 108) may be measured through strained-based sensors 112 and/or pressure sensors 112. The sensors 112 provide analog pressure time-varying signals $P_1(t), P_2(t), P_3(t), \ldots, P_N(t)$ to a signal processor 114, which determines the parameter of the flow 102 using pressure signals from the sensors 112, and outputs the parameter as a signal 116.

While the apparatus 100 is shown as including four sensors 112, it is understood that the array 110 of sensors 112 may include two or more sensors 112, each providing a pressure signal P(t) indicative of unsteady pressure within the pipe 104 at a corresponding axial location X of the pipe 104. Generally, the accuracy of the measurement improves as the number of sensors 112 in the array 110 increases. Thus, the degree of accuracy provided by the greater number of sensors 112 is offset by the increase in complexity and time for computing the desired output parameter of the flow 102 and the number of sensors 112 used is dependent at least in part on the degree of accuracy desired and the desire update rate of the output parameter provided by the apparatus 100.

The signals $P_1(t) \ldots P_N(t)$ provided by the sensors 112 in the array 110 are processed by the signal processor 114, which may be part of a larger processing unit 118. For example, the signal processor 114 may be a microprocessor and the processing unit 118 may be a personal computer or other general purpose computer. It is contemplated that the signal processor 114 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

The signal processor 114 may output the one or more parameters 116 to a display 120 or another input/output (I/O) device 122. The I/O device 122 may also accept user input parameters. The I/O device 122, display 120, and signal processor 114 unit may be mounted in a common housing, which may be attached to the array 110 by a flexible cable, wireless connection, or the like. The flexible cable may also be used to provide operating power from the processing unit 118 to the array 110 if necessary.

Figure 5:
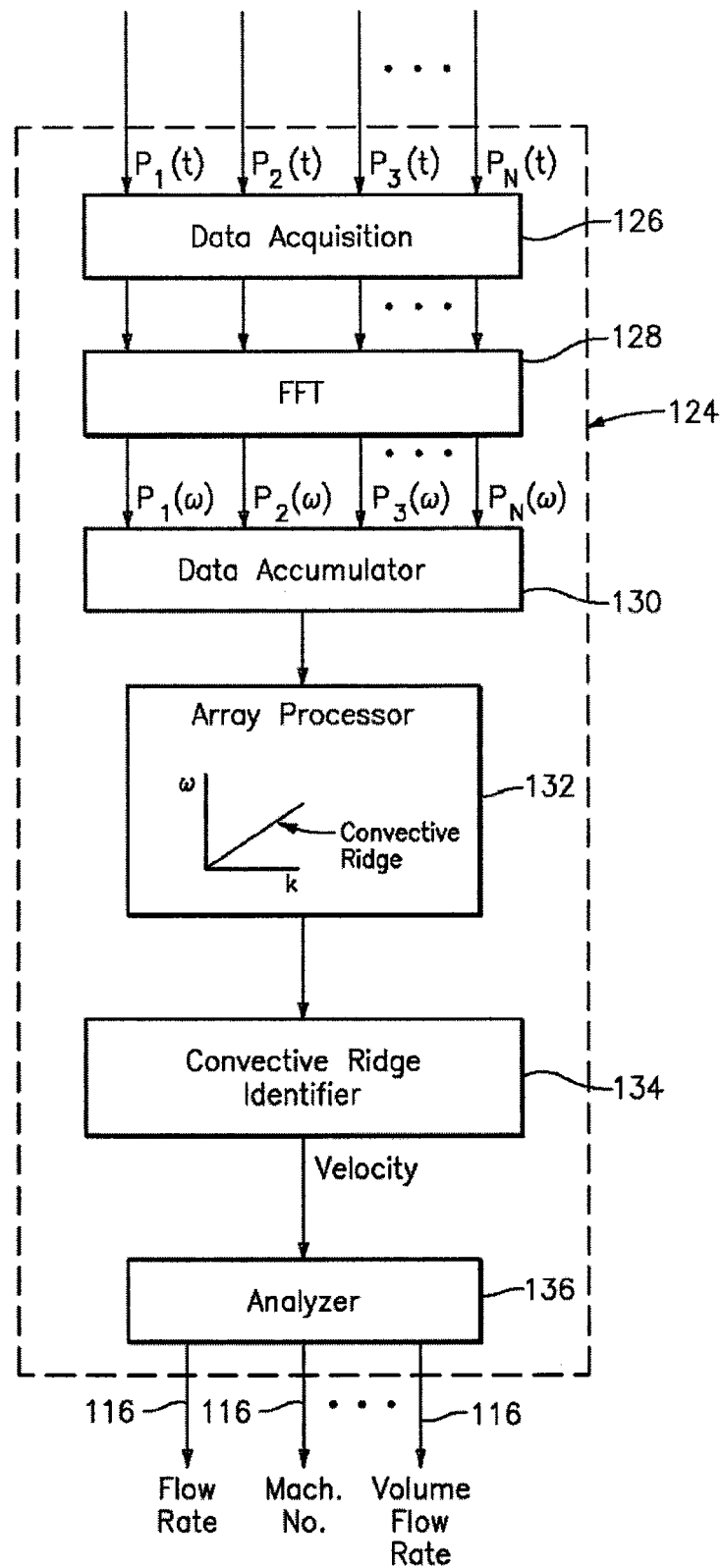
FIG. 5 is a block diagram of a flow logic known in the art.

To determine the one or more parameters 116 of the flow 102, the signal processor 114 applies the data from the sensors 112 to flow logic 124 executed by the signal processor 114. Referring to FIG. 5, an example of flow logic 124 is shown. Some or all of the functions within the flow logic 124 may be implemented in software (using a microprocessor or computer) and/or firmware, or may be implemented using analog and/or digital hardware, having sufficient memory, interfaces, and capacity to perform the functions described herein.

The flow logic 124 may include a data acquisition unit 126 (e.g., A/D converter) that converts the analog signals $P_1(t) \ldots P_N(t)$ to respective digital signals and provides the digital signals $P_1(t) \ldots P_N(t)$ to FFT logic 128. The FFT logic 128 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFT's, any other technique for obtaining the frequency domain characteristics of the signals $P_1(t)$-$P_N(t)$, may be used. For example, the cross-spectral density and the power spectral density may be used to form a frequency domain transfer functions (or frequency response or ratios) discussed hereinafter.

Figure 6:
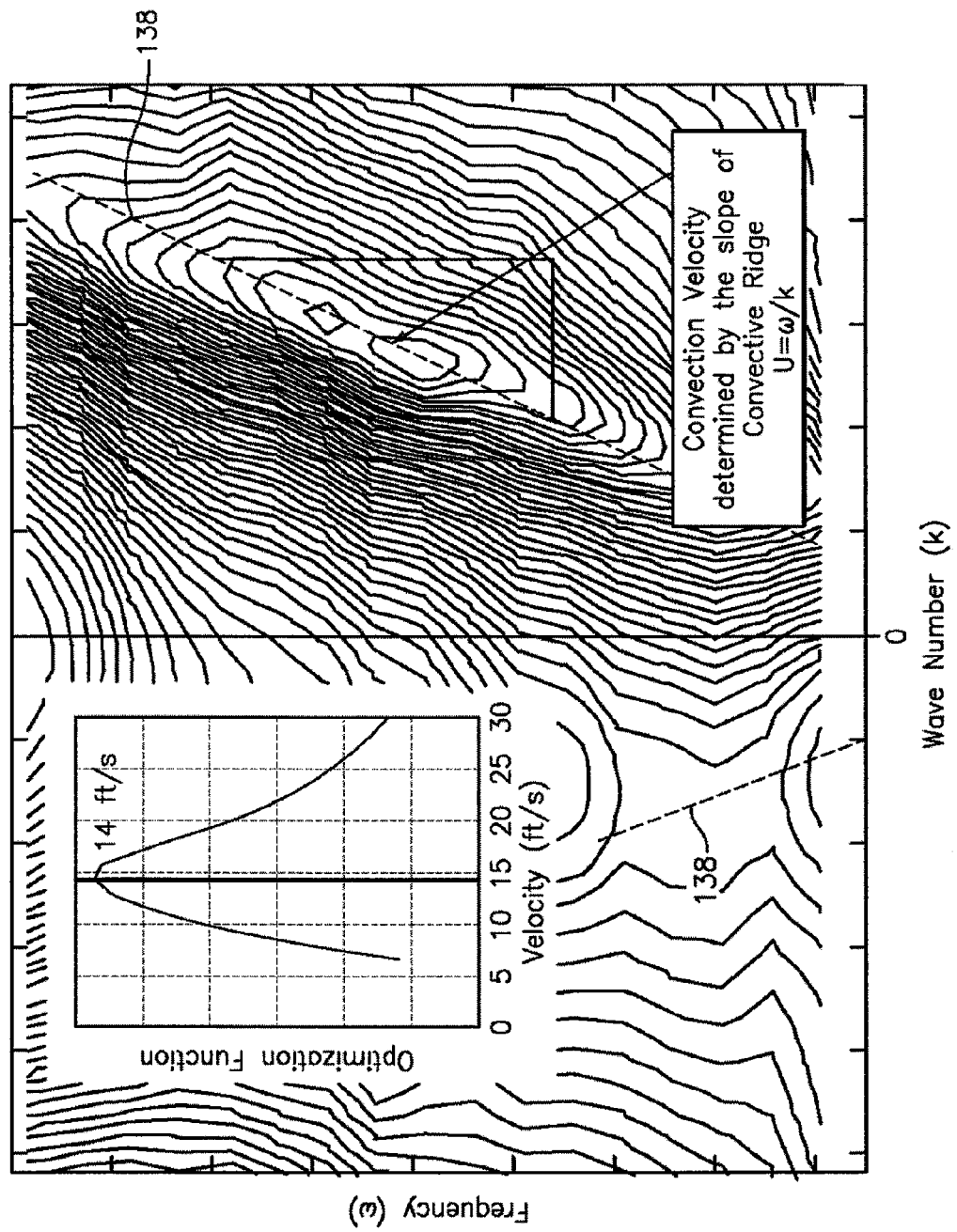
FIG. 6 is a k-ω plot of data processed from an apparatus known in the art that illustrates slope of the convective ridge, and a plot of the optimization function of the convective ridge.

One technique of determining the convection velocity of the coherent structures (e.g., turbulent eddies) 108 within the flow 102 is by characterizing a convective ridge of the resulting unsteady pressures using an array of sensors or other beam forming techniques, similar to that disclosed U.S. Pat. No. 6,609,069, which is incorporated herein by reference in its entirety. A data accumulator 130 accumulates the frequency signals $P_1(\omega)$-$P_N(\omega)$ over a sampling interval, and provides the data to an array processor 132, which performs a spatial-temporal (two-dimensional) transform of the sensor data, from the x-t domain to the k-$\omega$ domain, and then calculates the power in the k-$\omega$ plane, as represented by a k-$\omega$ plot (FIG. 6).

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$, where X, is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensors 112 apart from each other and yet still be within the coherence length.

Convective characteristics or parameters have a dispersion relationship that can be approximated by the straight-line equation, $$k=\omega/u, \quad \text{(Eqn. 1)}$$

where u is the convection velocity (flow velocity). A plot of k-$\omega$ pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. As will be described hereinafter, as the flow becomes increasingly dispersive, the convective ridge becomes increasingly non-linear. What is being sensed are not discrete events of coherent structures 108, but rather a continuum of possibly overlapping events forming a temporally stationary, essentially white process over the frequency range of interest. In other words, the convective coherent structures 108 are distributed over a range of length scales and hence temporal frequencies.

To calculate the power in the k-$\omega$ plane, as represented by a k-$\omega$ plot (see FIG. 6) of either the signals, the array processor 132 determines the wavelength and so the (spatial) wavenumber k, and also the (temporal) frequency and so the angular frequency $\omega$, of various of the spectral components of the stochastic parameter. There are numerous algorithms available in the public domain to perform the spatial/temporal decomposition of arrays of sensors 112. It should be appreciated that the present embodiment may use temporal and spatial filtering to precondition the signals to effectively filter out the common mode characteristics Pcommon mode and other long wavelength (compared to the sensor spacing) characteristics in the pipe 104 by differencing adjacent sensors 112 and retain a substantial portion of the stochastic parameter associated with the flow field and any other short wavelength (compared to the sensor spacing) low frequency stochastic parameters.

In the case of suitable coherent structures 108 being present, the power in the k-ω plane shown in a k-ω plot of FIG. 6 shows a convective ridge 138. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 138 with some slope, the slope indicating the flow velocity.

Once the power in the k-ω plane is determined, a convective ridge identifier 134 uses one or another feature extraction method to determine the location and orientation (slope) of any convective ridge 138 present in the k-ω plane. For example, in one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information. An analyzer 136 examines the convective ridge information including the convective ridge orientation (slope) and assuming the straight-line dispersion relation given by $k=\omega/u$, the analyzer 136 determines the flow velocity and/or volumetric flow, which are output as parameters 116. The volumetric flow may be determined by multiplying the cross-sectional area of the inside of the pipe 104 with the velocity of the process flow 102.

As previously noted, for turbulent, Newtonian fluids, there is typically not a significant amount of dispersion over a wide range of wavelength to diameter ratios. As a result, the convective ridge 138 in the k-ω plot is substantially straight over a wide frequency range and, accordingly, there is a wide frequency range for which the straight-line dispersion relation given by $k=\omega/u$ provides accurate flow velocity measurements. For stratified flows, however, some degree of dispersion exists such that coherent structures 108 convect at velocities which depend on their size. As a result of increasing levels of dispersion, the convective ridge 138 in the k-ω plot becomes increasingly non-linear. Thus, unlike the non-dispersive flows, determining the flow rate of a dispersive mixture by tracking the speed at which coherent structures 108 convect requires a methodology that accounts for the presence of significant dispersion, as described in greater detail in U.S. patent application Ser. No. 11/077,709, filed on Mar. 10, 2005, which is incorporated herein by reference.

In the embodiment shown in FIG. 3 and FIG. 4, each of the sensors 112 is formed by a strip of piezoelectric material 140 such as, for example, the polymer, polarized fluoropolymer, PVDF, which measures the strain induced within the pipe 104 due to the coherent structures convecting with the flow 102, similar to that described in U.S. patent application Ser. No. 10/712,818 and U.S. Provisional patent application Ser. No. 10/712,833, which are incorporated herein by reference. The sensors 112 can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The PVDF sensors include PVDF material disposed between a pair of conductive layers. The conductive layers are electrically connected to a processor by a pair of twisted wires, wherein the conductive layer may be formed of silver ink. The strips of piezoelectric film material forming the sensors 112 along each axial location $x_1 \ldots x_N$ of the pipe 104 may be adhered to the surface of a steel strap 142 (e.g., a hose clamp) that extends around and clamps onto the outer surface of the pipe 104. As discussed hereinafter, other types of sensors 112 and other methods of attaching the sensors 112 to the pipe 104 may be used.

As shown in FIG. 4, the PVDF material 140 of each sensor 112 is disposed substantially around the circumference of the pipe 104, which enables the sensing material 140 to measure pressure disturbances attributed to the convective vortices 106 propagating with the fluid flow 102. The configuration of the sensing material being disposed substantially around the circumference of the pipe 104 filters out pressure disturbances associated with vibration and other bending modes of the pipe 104. Unfortunately, the sensors 112 also sense unsteady pressure attributed to acoustic pressures or noise within the pipe 104, wherein the measurement of these acoustic pressures decreases the signal to noise ratio when measuring the convective turbulence 106.

In the geometry of the sensors 112 (in FIG. 4), asymmetric bending modes create equal and opposite deformation of the sensor 112 and therefore create no signal. Acoustic modes create a uniform distortion, and therefore create a signal along with a signal associated with vortical disturbances. (One might expect the acoustic signal to scale with the sensor length and the vortical signal to scale as the square root of the sensor length.) Additionally, pressure pulses and pipe fluids with uniform varying temperatures should also produce signals in this configuration. These signals, i.e. signals from the acoustic pressures, the pressure pulses, and the varying temperature fluids may degrade the measurement of the vortical pressure disturbance (vortical signals).

One method of filtering the acoustic noise is to difference the signals of adjacent sensors 112. While this increases the signal to noise ratio, it would be advantageous if each sensor 112 had the ability to filter both the unsteady pressures associated with the bending modes of the pipe 104 and the acoustic noise (or pressure field).

It should be appreciated that in any of the embodiments described herein, the sensors 112 may include electrical strain gages, optical fibers and/or gratings, ported sensors, ultrasonic sensors, among others as described herein, and may be attached to the pipe by adhesive, glue, epoxy, tape or other suitable attachment means to ensure suitable contact between the sensor 112 and the pipe 104. The sensors 112 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 104. If desired, for certain applications, gratings may be detached from (or strain or acoustically isolated from) the pipe 104 if desired. It is also contemplated that any other strain sensing technique may be used to measure the variations in strain in the pipe 104, such as highly sensitive piezoelectric, electronic or electric, strain gages attached to or embedded in the pipe 104.

It should be further appreciated that in various embodiments of the present invention, a piezo-electronic pressure transducer may be used as one or more of the pressure sensors and it may measure the unsteady (or dynamic or ac) pressure variations inside the pipe 104 by measuring the pressure levels inside the pipe 104. For example, in one embodiment of the present invention, the sensors 112 may comprise pressure sensors manufactured by PCB Piezotronics of Depew, N.Y. and/or may include integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The sensors 112 may incorporate a built-in MOSFET microelectronic amplifier to convert the high-impedance charge output into a low-impedance voltage signal. The sensors 112 may be powered from a constant-current source and can operate over long coaxial or ribbon cable without signal degradation. It should be appreciated that the low-impedance voltage signal is not affected by triboelectric cable noise or insulation resistance-degrading contaminants and power to operate integrated circuit piezoelectric sensors generally takes the form of a low-cost, 24 to 27 VDC, 2 to 20 mA constant-current supply. Most piezoelectric pressure sensors are constructed with either compression mode quartz crystals preloaded in a rigid housing, or unconstrained tourmaline crystals. These designs advantageously give the sensors microsecond response times and resonant frequencies in the hundreds of kHz, with minimal overshoot or ringing, wherein small diaphragm diameters ensure spatial resolution of narrow shock waves.

Additionally, the output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore it is contemplated that each of the sensors 112 may include a piezoelectric sensor that provides a piezoelectric material to measure the unsteady pressures of the flow 102. The piezoelectric material, such as the polymer, polarized fluoropolymer, PVDF, measures the strain induced within the process pipe 104 due to unsteady pressure variations within the flow 102. Strain within the pipe 104 is transduced to an output voltage or current by the attached piezoelectric sensors 112. The PVDF material forming each piezoelectric sensor 112 may be adhered to the outer surface of a steel strap that extends around and clamps onto the outer surface of the pipe 112. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique include non-intrusive flow rate measurements, low cost, a measurement technique requires no excitation source (i.e. ambient flow noise is used as a source), flexible piezoelectric sensors can be mounted in a variety of configurations to enhance signal detection schemes (these configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals) and higher temperatures (140 C) (co-polymers).

It should be appreciated that the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The scope of the invention is also intended to include sensing the entrained air formed in the concrete using the sensing and signal processing technology disclosed in PCT application serial no. PCT/US11/27731, filed 9 Mar. 2011 (WFVA/CiDRA file nos. 712-2.338-1/35), which claims benefit to provisional patent application Ser. No. 61/311,993, filed 9 Mar. 2010 (WFVA/CiDRA file nos. 712-2.338/35); and Ser. No. 61/312,023, filed 9 Mar. 2010 (WFVA/CiDRA file nos. 712-2.340/37), and Ser. No. 61/448,443, filed 2 Mar. 2011 (WFVA/CiDRA file nos. 712-2.353/47 and 51), which are all incorporated by reference in their entirety.

The scope of the invention is also intended to include sensing the entrained air formed in the concrete using the sensing and signal processing technology disclosed in PCT application serial no. PCT/US11/27682, filed 9 Mar. 2011 (WFVA/CiDRA file nos. 712-2.339-1/36), which claims benefit to provisional patent application Ser. No. 61/312,008, filed 9 Mar. 2010 (WFVA/CiDRA file nos. 712-2.339/36), which are all incorporated by reference in their entirety.

THE SCOPE OF THE INVENTION

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:

1. An improved concrete comprising:
   a concrete formed from a wet concrete mixture; and
   a non-chemical admix added to the wet concrete mixture and configured to contain bubbles in order to control the amount of entrained air formed in the concrete when the wet concrete mixture cures into the improved concrete, the non-chemical admix comprising a multiplicity of hollow cylinders thereof, each having a respective cavity, unfilled space, or hole to trap and maintain a bubble inside, each having a dimension so as not to absorb liquid, including water, into the respective cavity, unfilled space, or hole, the hollow cylinders being hollow glass cylinders manufactured of glass using a drawing and dicing process and being configured with hydrophobic chemicals applied to prevent migration of liquid into respective cavities before the wet concrete mixture cures.

2. An improved concrete according to claim 1, wherein the hydrophobic chemicals have a half life longer than the cure time of the concrete.

3. An improved concrete according to claim 1, wherein the wet concrete mixture includes antifoam chemicals to prevent the development of standard bubbles.

4. An improved concrete according to claim 1, wherein the bubble is a small quantity of gas, including air.

5. An improved concrete according to claim 1, wherein the wet concrete mixture comprises some combination of a coarse aggregate, a fine aggregate, Portland cement, and water.

6. An improved concrete according to claim 5, wherein the coarse aggregate comprises gravel, including between 0.5 to 1.5 inch in diameter, or the fine aggregate comprises sand, including between 0.005 and 0.25 inch in diameter.

7. A method for making an improved concrete comprising:
forming a concrete from a wet concrete mixture; and
adding to the wet concrete mixture a non-chemical admix configured to contain bubbles in order to control the amount of entrained air formed in the concrete when the wet concrete mixture cures into the improved concrete, the non-chemical chemical admix comprising a multiplicity of hollow cylinders thereof, each having a respective cavity, unfilled space, or hole to trap and maintain a bubble inside, each having a dimension so as not to absorb liquid, including water, into the respective cavity, unfilled space, or hole, the hollow cylinders being hollow glass cylinders manufactured of glass using a drawing and dicing process and being configured with hydrophobic chemicals applied to prevent migration of liquid into respective cavities before the wet concrete mixture cures.

8. A method according to claim 7, wherein each hollow object, body, element or structure is configured with a dimension so as not to absorb liquid, including water, including where the dimension is in a range of about 20-30 microns.

9. A method according to claim 7, wherein the multiplicity of hollow objects, bodies, elements or structures comprises a number in a range of 1 billion parts per cubic foot of concrete.

10. A method according to claim 7, wherein the hydrophobic chemicals have a ½ life longer than the cure time of the concrete.

11. A method according to claim 7, wherein the chemicals are sealants.

12. A method according to claim 7, wherein the wet concrete mixture includes antifoam chemicals to prevent the development of standard bubbles.

13. A method according to claim 7, wherein the bubble is a small quantity of gas, including air.

14. A method according to claim 7, wherein the amount of entrained air formed in the concrete is in a predetermined range of about 4% to 6%.

15. A method according to claim 7, wherein the wet concrete mixture comprises some combination of a coarse aggregate, a fine aggregate, Portland cement, and water.

16. A method according to claim 15, wherein the coarse aggregate comprises gravel, including between 0.5 to 1.5 inch in diameter, or the fine aggregate comprises sand, including between 0.005 and 0.25 inch in diameter.

17. A method according to claim 7, wherein the method comprises sensing the amount of entrained air in the wet concrete mixture.

18. A method according to claim 17, wherein the method comprises repeating the steps of sensing and adding the non-chemical admix until the amount of entrained air in the wet concrete mixture being sensed is in a predetermined range.

19. A method according to claim 17, wherein the predetermined range about 4% to 6% of entrained air in the wet concrete mixture.

20. A method according to claim 17, wherein the sensing comprises using a SONAR-based meter based at least partly on sensing unsteady pressures in the wet concrete mixture in order to determine the amount of entrained air in the wet concrete mixture.

21. An improved concrete prepared in accordance with the method recited in claim 7.

22. An improved concrete according to claim 5, wherein the non-chemical admix is made from a material that is substantially the same as the material used for the fine aggregate.

23. A method according to claim 15, wherein the non-chemical admix is made from a material that is substantially the same as the material used for the fine aggregate.

* * * * *